United States Patent
Suzuki

(10) Patent No.: US 9,128,319 B2
(45) Date of Patent: Sep. 8, 2015

(54) COLOR FILTER SUBSTRATE AND TRANSFLECTIVE LIQUID CRYSTAL DISPLAY DEVICE

(71) Applicant: BOE Technology Group Co., Ltd., Beijing (CN)

(72) Inventor: Teruaki Suzuki, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 31 days.

(21) Appl. No.: 14/052,885

(22) Filed: Oct. 14, 2013

(65) Prior Publication Data
US 2014/0104549 A1 Apr. 17, 2014

(30) Foreign Application Priority Data
Oct. 12, 2012 (CN) .......................... 2012 1 0387865

(51) Int. Cl.
*G02F 1/1335* (2006.01)
*G02F 1/1333* (2006.01)

(52) U.S. Cl.
CPC .... *G02F 1/133514* (2013.01); *G02F 1/133555* (2013.01)

(58) Field of Classification Search
CPC ................... G02F 1/133514; G02F 1/133512; G02F 1/133516; G02F 2201/52; G02F 1/133555; G02F 1/133371; G02F 1/1333; G02F 1/133305; G02F 1/133351; G02F 1/136227

USPC .................................. 349/106, 109, 114, 158
See application file for complete search history.

(56) References Cited

U.S. PATENT DOCUMENTS

2005/0243247 A1* 11/2005 Ryu .............................. 349/106
2006/0119770 A1* 6/2006 Ting et al. ..................... 349/114

FOREIGN PATENT DOCUMENTS

CN 1492263 A * 4/2004 ............ G02F 1/1333

OTHER PUBLICATIONS

First Office Action issued by State Intellectual Property Office of the People's Republic of China dated Jul. 22, 2014, 6pgs.
English translation of First Office Action issued by State Intellectual Property Office of the People's Republic of China dated Jul. 22, 2014, 4pgs.
Second Office Action (Chinese language) issued by the State Intellectual Property Office ("SIPO") on Dec. 4, 2014 for International Application No. 2012103878659, 5 pages.
English translation of second Office Action issued by SIPO for International Application No. 2012103878659, 4 pages, Dec. 4, 2014.

* cited by examiner

*Primary Examiner* — Mike Qi

(57) ABSTRACT

Embodiments of the present invention relate to a Color filter substrate and a transflective liquid crystal display device. The color filter substrate comprises: a base substrate; a plurality of pixel regions each of which is divided into a transmissive region and a reflective region and comprises a color filter formed on the base substrate, wherein, the boundary region of each pixel region adjacent to a neighboring pixel region comprises at least one light hole which corresponds to the reflective region of the pixel region where it is located.

18 Claims, 4 Drawing Sheets

COLOR FILTER SUBSTRATE AND TRANSFLECTIVE LIQUID CRYSTAL DISPLAY DEVICE

CROSS REFERENCE TO RELATED APPLICATIONS

This application claims priority from Chinese National Application No. 201210387865.9 filed on Oct. 12, 2012, the contents of which are incorporated herein by reference.

TECHNICAL FIELD

Embodiments of the present invention relate to a color filter substrate and a transflective liquid crystal display device.

BACKGROUND

The liquid crystal display (LCD) is one of the most widely used flat panel displays. According to light sources used in the LCD, the LCDs are divided into a transmissive LCD and a reflective LCD. The transmissive LCD uses a backlight as the light source, and after transmitted through a polarizer and a liquid crystal panel, only about 10% of light from the backlight is obtained, and therefore, in order to improve a brightness of the transmissive LCD, a power consumption of the backlight needs to be increased. The reflective LCD can only be used during daytime or in the presence of an external light, and cannot be used at night or in the situation of a weak light. Therefore, a transflective LCD is developed correspondingly, which uses the backlight or the external light as the light source according to the environment.

FIG. 1 illustrates a cross-sectional view of a current transflective LCD, and the current transflective LCD comprises: an upper substrate 160; a lower substrate 150; a liquid crystal layer 180, interposed between the upper substrate 160 and the lower substrate 150; and a backlight 170, located at a side opposite to the upper substrate 160 of the lower substrate 150. A common electrode 162 is interposed between the upper substrate 160 and the liquid crystal layer 180, and a pixel electrode is divided into a transmissive region electrode 164 and a reflective region electrode 152, wherein the transmissive region electrode 164 is located in a transmissive region t of the lower substrate 150, and the reflective region electrode 152 is located in a reflective region r of the lower substrate 150. The color filter 168 is located between the upper substrate 160 and the common electrode 162. In a transmissive mode, the light 174 emitted from the backlight 170 passes through the lower substrate 150, the transmissive region electrode 164, the color filter 168 and the upper substrate 160. In a reflective mode, an environment light 172 is incident on the reflective region electrode 152 through the upper substrate 160, the color filter 168 and the common electrode 162, and then is reflected by the reflective region electrode 152 and passes through the color filter 168 and the upper substrate 160 again.

In the transmissive region t, the light 174 emitted from the backlight 170 only passes through the color filter 168 once, while, in the reflective region r, the environment light 172 passes through the color filter 168 twice, and thus, a color saturation of the reflective region may be larger than that of the transmissive region. Therefore, a method of forming a hole or a slit in the color filter 168 is used, so that the color saturation of the reflective region tends to be consistent with that of the transmissive region.

FIG. 2 illustrates a plan schematic view of a current color filter substrate. As shown in FIG. 2, the color filter substrate comprises three kind of pixel region of R (red), G (green) and B (blue), and a boundary region between adjacent two pixel regions is arranged with a black matrix, each pixel region is divided into a reflective region and a transmissive region, and the black matrix is located between two adjacent color filters. The reflective regions are respectively denoted as R(r), G(r) and B(r), the transmissive regions are respectively denoted as R(t), G(t) and B(t), the color filters are respectively denoted as 210R, 220G and 230B, corresponding light holes in the pixel regions are respectively denoted as 210W, 220W and 230W, and the black matrix is denoted as 240. The color filter substrate with the black matrix and the light holes can lower the color saturation of the reflective region by adjusting a size of the light hole, however, as the black matrix is used to prevent the light leakage, the color filter substrate has a relatively low aperture ratio and a display screen having the color filter substrate has a relatively low brightness.

FIG. 3 illustrates a plan schematic view of another current color filter substrate. Such color filter substrate comprises three kinds of pixel region of R (red), G (green) and B (blue), and each pixel region is divided into a reflective region and a transmissive region. The reflective regions are respectively denoted as R(r), G(r) and B(r), the transmissive regions are respectively denoted as R(t), G(t) and B(t), the color filters are respectively denoted as 310R, 320G and 330B, and corresponding light holes in the three pixel regions are respectively denoted as 310W, 320W and 330W. For such color filter substrate, the color filters in different pixel regions are directly adjacent to each other and there is not provided black matrix between two adjacent pixel regions, thus, an aperture ratio and a screen brightness are relatively high, however, each two adjacent pixel regions are directly adjacent to each other, and thus, a relatively high alignment precise between the upper substrate and the lower substrate is required, and when the alignment precise is slightly low, the poor display may be caused and the color mixture may occurs between two adjacent pixel regions with different colors.

Therefore, as for the current color filter substrate used in a transflective liquid crystal display device, when an black matrix is provided, a lower aperture ratio and a lower screen brightness may be caused; in a case that the black matrix is not provided between adjacent color filter with different colors so as to increase the aperture ratio, when the alignment precise between two substrates is slightly low, the poor display may be caused and the color mixture may occurs between two adjacent pixel regions with different colors.

SUMMARY

Embodiments of the present invention provide a color filter substrate and a transflective liquid crystal display device, which can improve the aperture ratio and the screen brightness, and avoid the poor display and the color mixture when an alignment precision is slightly low.

An embodiment of the present invention provides a color filter substrate, comprising: a base substrate; a plurality of pixel regions, each of the plurality of pixel regions is divided into a transmissive region and a reflective region and comprises a color filter formed on the base substrate; and at least one light hole, formed in a boundary region of each pixel region adjacent to a neighboring pixel region, wherein the at least one light hole corresponds to the reflective region of the pixel region where it is located.

An embodiment of the present invention provides a transflective liquid crystal display device, comprising: an array substrate; and a color filter substrate as mentioned above, wherein the array substrate is provided with a plurality of pixel electrodes, and each pixel electrode comprises a transmissive region electrode provided in the transmissive region and a reflective region electrode provided in the reflective region.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

By forming a light hole in a boundary region of each pixel region adjacent to a neighboring pixel region, a color filter substrate according to an embodiment of the present invention has a improved aperture ratio, and when a alignment precision is not high, the possibility of poor displaying is reduced, and a issue that a color mixture easily occurs between adjacent color filters of a liquid crystal display having a high aperture ratio is avoided.

The embodiments of the present invention will be further described hereinafter in combination with the drawings of the description.

Figure 1:
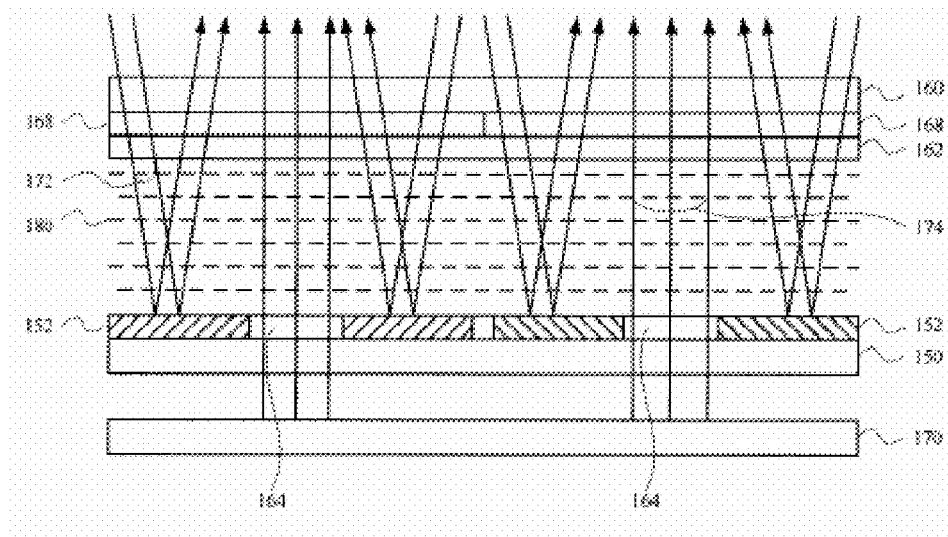
FIG. 1 illustrates a cross-sectional schematic view of a current transflective LCD.
Figure 2:
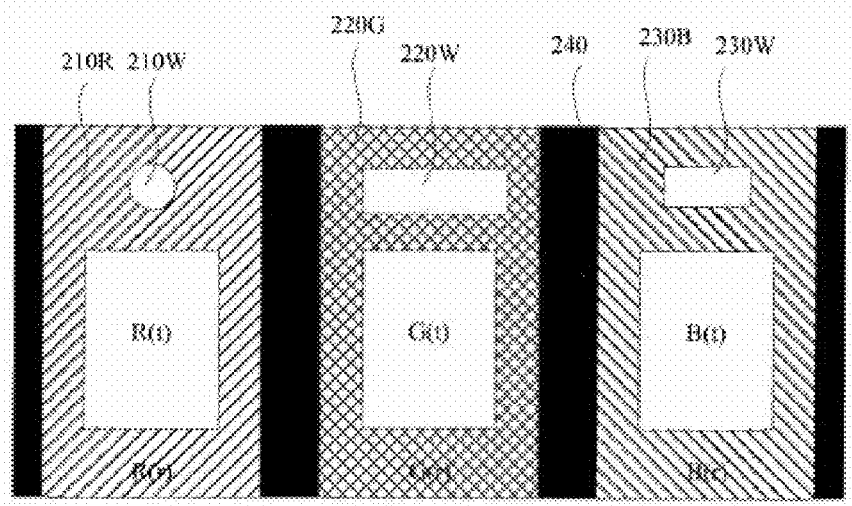
FIG. 2 illustrates a plan schematic view of a current color filter substrate.
Figure 3:
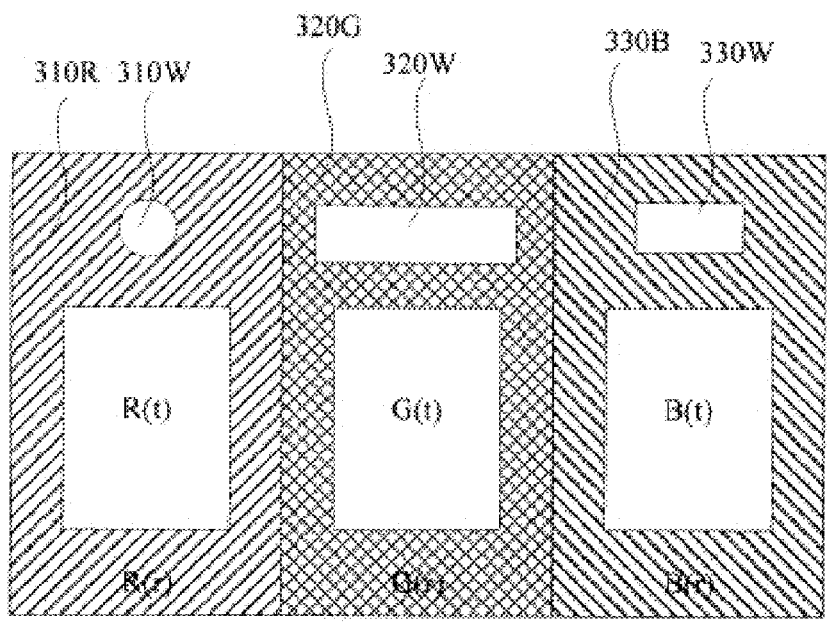
FIG. 3 illustrates a plan schematic view of another current color filter substrate.
Figure 4:
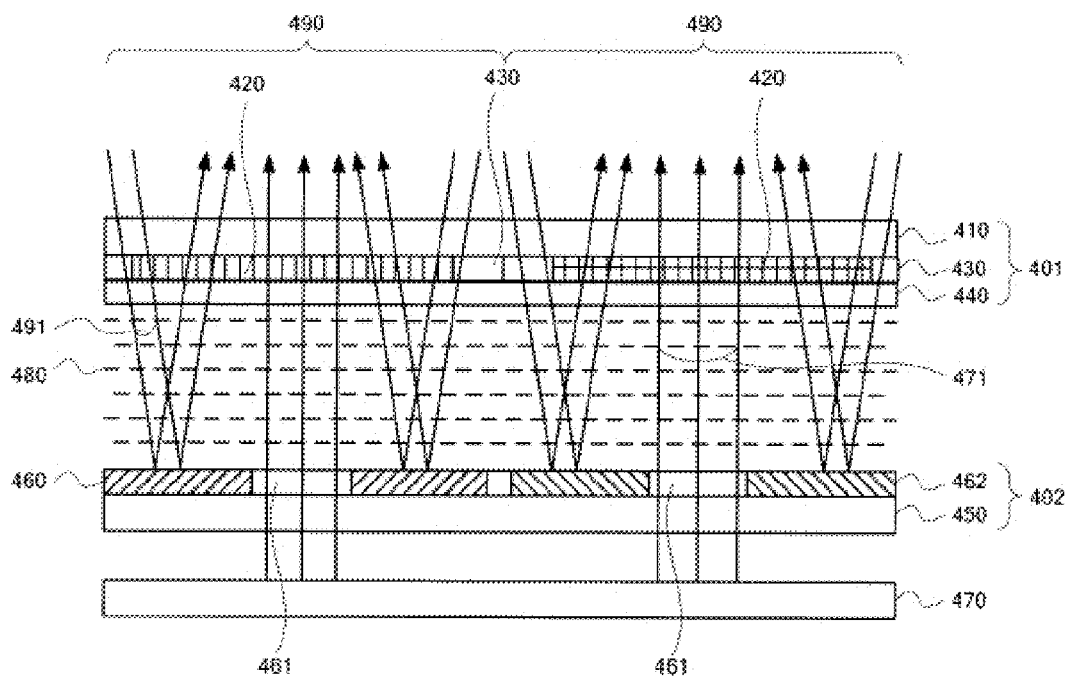
FIG. 4 illustrates a cross-sectional schematic view of a transflective liquid crystal display according to an embodiment of the present invention.

FIG. 4 illustrates a cross-sectional schematic view of a transflective liquid crystal display according to an embodiment of the present invention, and as shown in FIG. 4, the transflective liquid crystal display comprises: a color filter substrate 401; an array substrate 402; and a liquid crystal layer 480, interposed between the color filter substrate 401 and the array substrate 402. Herein, the color filter substrate 401 and the array substrate 402 are cell-assembled to form a liquid crystal cell, and the liquid crystal cell comprises a plurality of pixel regions 490 each of which corresponds to one pixel. The color filter substrate 401 comprises: a base substrate 410; a plurality of pixel regions 490, each of which is divided into a transmissive region and a reflective region and comprises one color filter 420 formed on the base substrate 410; at least one light hole 430, formed in a boundary region of each pixel region adjacent to a neighboring pixel region; and a common electrode 440, wherein the light hole 430 corresponds to the reflective region of the pixel region where it is located.

The array substrate comprises a lower substrate 450, a thin film transistor (not shown) and a plurality of pixel electrode 460, wherein, each pixel electrode 460 comprises a transmissive region electrode 461 and a reflective region electrode 462, and the transmissive region electrode 461 is located at the center of each pixel electrode 460. The transflective liquid crystal display further comprises a backlight unit 470 located below the array substrate 450. The common electrode 440 is located between the upper substrate 410 and the liquid crystal layer 480, and the color filter 420 and the light hole 430 are located between the upper substrate 410 and the common electrode 440, wherein, the boundary region of each pixel region 490 of the color filter substrate adjacent to a neighboring pixel region comprises at least one light hole 430; and the pixel electrode 460 is located between the liquid crystal layer 480 and the lower substrate 450.

In a transmissive mode, light 471 emitted from the backlight unit 470 passes through the lower substrate 450, the transmissive region electrode 461, the color filter 420 and the upper substrate 410. In a reflective mode, the propagation paths of environment light 491 are as follows.

A first path: the environment light 491 is incident on the reflective region electrode 462 through the upper substrate 410, the color filter 420 and the common electrode 440, and then is reflected by the reflective region electrode 462 and passes through the color filter 420 and the upper substrate 410 again.

A second path: the environment light 491 is incident on the reflective region electrode 462 through the upper substrate 410, the color filter 420 and the common electrode 440, and then is reflected by the reflective region electrode 462 and passes through the light hole 430 and the upper substrate 410.

A third path: the environment light 491 is incident on the reflective region electrode 462 through the upper substrate 410 and the light hole 430, and then is reflected by the reflective region electrode 462 and passes through the color filter 420 and the upper substrate 410.

A fourth path: the environment light 491 is incident on the reflective region electrode 462 through the upper substrate 410 and the light hole 430, and then is reflected by the reflective region electrode 462 and passes through the light hole 430 and the upper substrate 410.

Accordingly, by providing the light hole in the boundary region of each pixel region adjacent to a neighboring pixel region, the color saturation of the reflective region is effectively reduced, so that the transmissive region tends to be consistent with the reflective region in color saturation.

Figure 5:
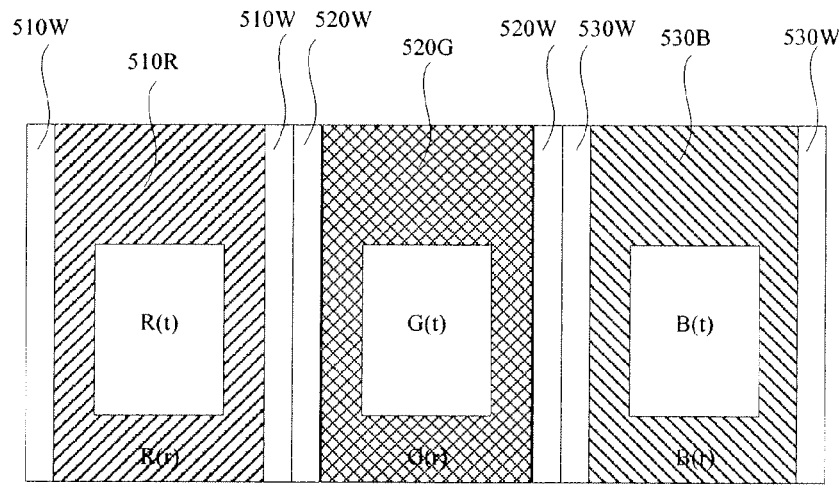
FIG. 5 is a plan schematic view of a color filter substrate according to an embodiment of the present invention.

FIG. 5 is a plan schematic view of a color filter substrate according to an embodiment of the present invention, and pixel regions of the color filter substrate are divided into red pixel regions, green pixel regions and blue pixel regions respectively denoted by R, G and B, wherein, the numbers of the red pixel regions, the green pixel regions and the blue pixel regions are the same, and one red pixel region, one green pixel region and one blue pixel region form a pixel region group, each liquid crystal display comprises a plurality of pixel region groups, and the pixel regions of each pixel region group are arranged in the same order. Each pixel region comprises a transmissive region and a reflective region, that is, one pixel region group comprises a red transmissive region R (t), a green transmissive region G (t), a blue transmissive region B (t), a red reflective region R (r), a green reflective region G (r) and a blue reflective region B (r), and the color filters are respectively denoted as 510R, 520G and 530B, and the light holes disposed in the boundary region are respectively identified as 510W, 520W and 530W.

Exemplarily, the boundary region of each pixel region adjacent to a neighboring pixel region comprises at least one light hole, that is, one red pixel region of one pixel region group comprises two light holes R (h), one green pixel region comprises two light holes G (h), one blue pixel region comprises two light holes B (h), and the at least one light hole in the boundary region of each pixel region is formed throughout the boundary region. Herein, the two light holes disposed in the boundary regions of adjacent two pixel regions can be formed integrally or separately, the embodiment of the present invention is not limited to this. Alternatively, the boundary region of each pixel region may be partly provided with a black matrix.

Figure 6:
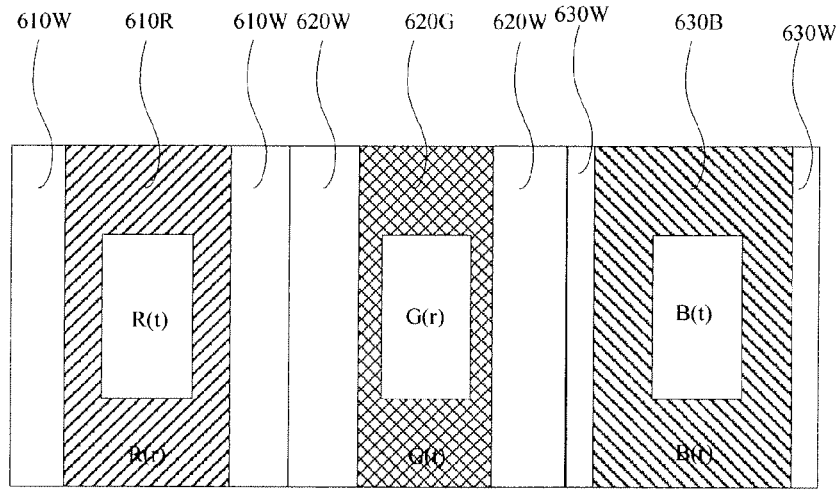
FIG. 6 is a plan schematic view of another color filter substrate according to an embodiment of the present invention.

Sizes of the light holes of the pixel regions with the same color can be the same or different; and sizes of the light holes of the pixel regions with different colors are different. FIG. 6 is a plan schematic view of another color filter substrate according to an embodiment of the present invention, as shown in FIG. 6, the sizes of the light holes in different pixel regions of the color filter substrate are different. Exemplarily, the pixel regions are divided into red pixel regions, green pixel regions and blue pixel regions, and the color filters in corresponding pixel regions are respectively identified as 610R, 620G and 630B, and the light holes in the boundary region of each pixel region are respectively identified as 610W, 620W and 630W; wherein, the light hole 620W of the green pixel region is larger than the light hole 610W of the red pixel region, the light hole 610W of the red pixel region is larger than the light hole 630W of the blue pixel region, and the light holes of each pixel region corresponds to the reflective region electrode of the pixel region.

The sizes of the light holes of the pixel regions with the same color on different color filter substrates may be different, and are determined mainly by the size of corresponding pixel region. When the pixel region of the color filter substrates is large, the size of the light hole of the pixel region is relatively larger; when the pixel region of the color filter substrates is small, the size of the light hole of the pixel region is relatively smaller. The sizes of the light holes are different depending on different brightness of the corresponding pixel regions having different colors, and their ratios in the corresponding pixel regions are also different, wherein, the light hole of the green pixel region can occupy 0%~85% of the green pixel region, the light hole of the red pixel region can occupy 0%—75% of the red pixel region, and the light hole of the blue pixel region can occupy 0%~50% of the blue pixel region.

Figure 7:
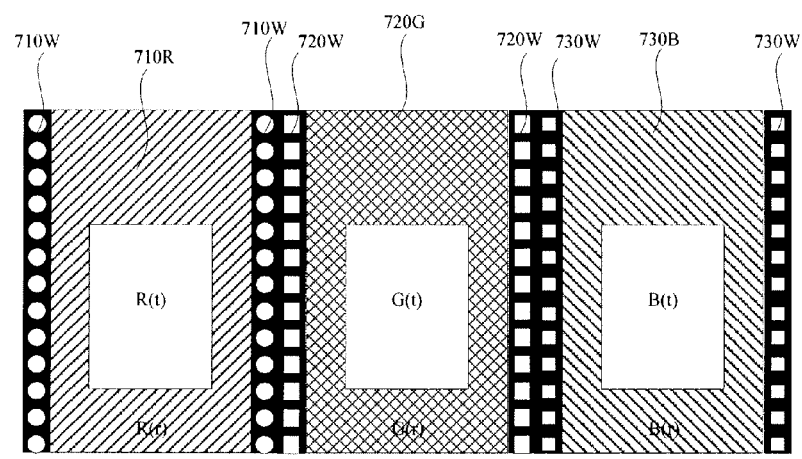
FIG. 7 is a plan schematic view of another color filter substrate according to an embodiment of the present invention.
Figure 8:
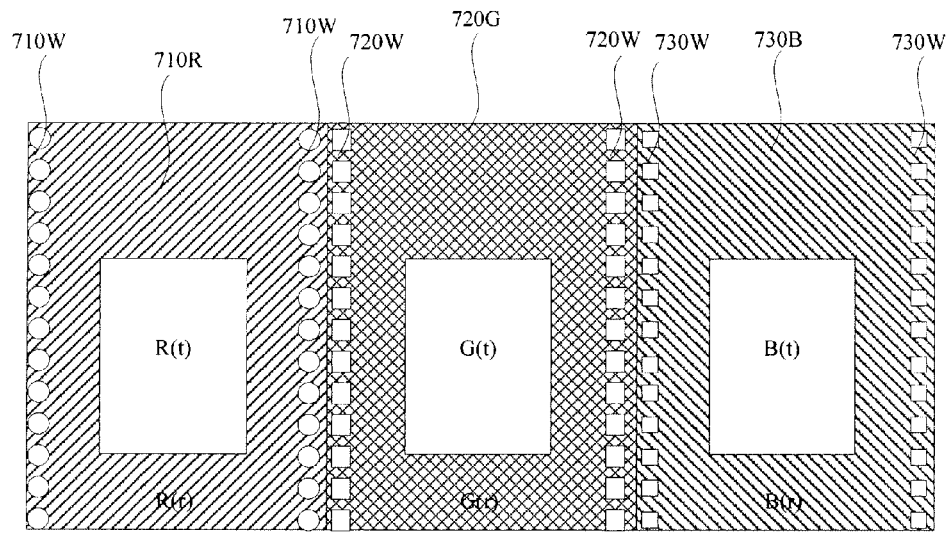
FIG. 8 is a plan schematic view of another color filter substrate according to an embodiment of the present invention.

The boundary region of each pixel region can comprise two or more light holes. FIGS. 7 and 8 respectively illustrate plan schematic views of another two color filter substrates according to the embodiments of the present invention, as shown in FIGS. 7 and 8, between color filters of two adjacent pixel regions, there are provided a plurality of light holes, and the boundary region of each pixel region comprises one light hole region in which a plurality of light holes are arranged in a certain order, the color filters are respectively identified as 710R, 720G and 7308, and the light hole regions of the pixel regions are respectively identified as 710W, 720W and 730W.

As shown in FIG. 7, a black matrix provided in the boundary region of each pixel region and a black matrix provided in the boundary region of the neighboring pixel region are formed as an integral body, and in the integral black matrix, there is provided at least one light hole.

As shown in FIG. 8, the color filter disposed in each pixel region extends to the boundary region thereof, and the color filters of two adjacent pixel regions are directly adjacent to each other, and in the boundary region, there is the at least one light hole in each color filter.

Exemplarily, the light hole total area of the light hole regions of the pixel regions having different colors are different, and the light hole total area of the light hole region of the green pixel region is larger than that of the light hole region of the red pixel region, and the light hole total area of the light hole region of the red pixel region is larger than that of the light hole region of the blue pixel region. The light hole region corresponds to the reflective region of the pixel region where it is located.

Exemplarily, the shape of the light hole can be rectangular or circle according to needs.

By forming a light hole in a boundary region of each pixel region adjacent to a neighboring pixel region, a color filter substrate according to an embodiment of the present invention has a improved aperture ratio, and when a alignment precision is not high, the possibility of poor displaying is reduced, and a issue that a color mixture easily occurs between adjacent color filters of a liquid crystal display having a high aperture ratio is avoided.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A color filter substrate, comprising:
   a base substrate;
   a plurality of pixel regions, each of the plurality of pixel regions is divided into a transmissive region and a reflective region and comprises a color filter formed on the base substrate; and
   at least one light hole, formed in a boundary region of each pixel region adjacent to a neighboring pixel region,
   wherein the at least one light hole corresponds to the reflective region of the pixel region where it is located,
   wherein the at least one light hole in the boundary region of each pixel region is formed throughout the boundary region thereof.

2. The color filter substrate according to claim 1, wherein, a black matrix provided in the boundary region of each pixel region and a black matrix provided in the boundary region of the neighboring pixel region are formed as an integral body, and the at least one light hole is formed in the integral black matrix.

3. The color filter substrate according to claim 2, wherein, the black matrix in the boundary region of each pixel region is provided with two or more light holes.

4. The color filter substrate according to claim 1, wherein, the color filter disposed in each pixel region extends to the boundary region thereof, and the color filters of two adjacent pixel regions are directly adjacent to each other, and in the boundary region, there is the at least one light hole in each color filter.

5. The color filter substrate according to claim 4, wherein, the color filter in the boundary region of each pixel region is provided with two or more light holes.

6. The color filter substrate according to claim 1, wherein, the light hole in the boundary region of each pixel region and the light hole in the boundary region of the neighboring pixel region are integrally formed.

7. The color filter substrate according to claim 1, wherein, any two pixel regions have the same size.

8. The color filter substrate according to claim 7, wherein, the plurality of pixel region comprises:
 a plurality of red pixel regions, a plurality of green pixel regions and a plurality of blue pixel regions, and each pixel region comprises a color filter with a corresponding color; and
 the numbers of the red pixel regions, the green pixel regions and the blue pixel regions are the same.

9. The color filter substrate according to claim 8, wherein, an area of the light hole in the green pixel region is larger than that of the light hole in the red pixel region, and the area of the light hole in the red pixel region is larger than that of the light hole in the blue pixel region.

10. The color filter substrate according to claim 9, wherein, the area of the light hole in the green pixel region is 0%~85% of an area of the green pixel region, the area of the light hole in the red pixel region is 0%~75% of an area of the red pixel region, and the area of the light hole in the blue pixel region is 0%~50% of an area of the blue pixel region.

11. The color filter substrate according to claim 8, wherein, the plurality of pixel regions form a plurality of pixel region groups, each pixel region group comprises one red pixel region, one green pixel region and one blue pixel region, and the pixel regions of each pixel region group are arranged in the same order.

12. The color filter substrate according to claim 1, wherein, the light hole is in a rectangular or circle shape.

13. The color filter substrate according to claim 1, wherein, the boundary region of each pixel region is partly provided with a black matrix.

14. The color filter substrate according to claim 13, wherein, the light hole is provided in the black matrix or in the boundary region except the black matrix.

15. The color filter substrate according to claim 1, wherein, the boundary region of each pixel region is provided with two or more light holes.

16. The color filter substrate according to claim 1, further comprising:
 a common electrode, formed on the base substrate with the color filter formed thereon.

17. A transflective liquid crystal display device, comprising:
 an array substrate; and
 a color filter substrate according to claim 1,
 wherein the array substrate is provided with a plurality of pixel electrodes, and each pixel electrode comprises a transmissive region electrode provided in the transmissive region and a reflective region electrode provided in the reflective region.

18. The transflective liquid crystal display device according to claim 17, wherein, the transmissive region electrode is located at a center of each pixel electrode.

* * * * *